(12) United States Patent
Jang et al.

(10) Patent No.: US 12,488,763 B2
(45) Date of Patent: Dec. 2, 2025

(54) DISPLAY APPARATUS AND CONTROL METHOD THEREOF

(71) Applicant: SAMSUNG ELECTRONICS CO., LTD., Suwon-si (KR)

(72) Inventors: Hyukjun Jang, Suwon-si (KR); Kyehoon Lee, Suwon-si (KR); Sungyeol Kim, Suwon-si (KR); Seungyong Shin, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/821,395

(22) Filed: Aug. 30, 2024

(65) Prior Publication Data
US 2024/0428746 A1 Dec. 26, 2024

Related U.S. Application Data

(63) Continuation of application No. PCT/KR2023/003156, filed on Mar. 8, 2023.

(30) Foreign Application Priority Data

Apr. 7, 2022 (KR) .......................... 10-2022-0043568

(51) Int. Cl.
G09G 3/34 (2006.01)
G09G 3/32 (2016.01)

(52) U.S. Cl.
CPC ............. *G09G 3/3426* (2013.01); *G09G 3/32* (2013.01); *G09G 2300/0842* (2013.01); *G09G 2320/0233* (2013.01); *G09G 2320/0247* (2013.01)

(58) Field of Classification Search
CPC ...... G09G 3/3406; G09G 3/3426; G09G 3/32; G09G 3/34; G09G 3/36; G09G 2300/0842;
(Continued)

(56) References Cited

U.S. PATENT DOCUMENTS 6,373,457 B1 * 4/2002 Kim .................. G09G 3/3614
345/94
7,276,863 B2 10/2007 Lee et al.
(Continued)

FOREIGN PATENT DOCUMENTS

JP 2006-220851 A 8/2006
JP 2008-116853 A 5/2008
(Continued)

OTHER PUBLICATIONS

International Search Report (PCT/ISA/210) issued on Jun. 26, 2023 by the International Searching Authority in International Application No. PCT/KR2023/003156.
(Continued)

*Primary Examiner* — Ke Xiao
*Assistant Examiner* — Jennifer L Zubajlo
(74) *Attorney, Agent, or Firm* — Sughrue Mion, PLLC

(57) ABSTRACT

A display apparatus may include: at least one LED block including LEDs connected in series; a driver IC configured to apply a voltage to the at least one LED block; at least one processor; and memory storing at least one instruction that, when executed by the at least one processor, cause the display apparatus to: detect at least one forward voltage of the at least one LED block, respectively, based on a first voltage being applied to the at least one LED block; determine a margin voltage based on a difference between the first voltage and the at least one forward voltage; and determine a second voltage to be applied to the at least one LED block based on the first voltage and the margin voltage.

9 Claims, 11 Drawing Sheets

(58) Field of Classification Search
CPC ... G09G 2320/0233; G09G 2320/0247; G09G 2330/00
See application file for complete search history.

(56) References Cited

U.S. PATENT DOCUMENTS

| | | | |
|---|---|---|---|
| 8,648,545 | B2 | 2/2014 | Lee et al. |
| 9,237,620 | B1 | 1/2016 | Knapp et al. |
| 9,320,094 | B2 | 4/2016 | Szczeszynski et al. |
| 10,311,786 | B2 | 6/2019 | Oh et al. |
| 10,790,819 | B1* | 9/2020 | Zhang ................. H03K 17/735 |
| 10,885,852 | B2 | 1/2021 | Zhang et al. |
| 11,024,222 | B2 | 6/2021 | Cho et al. |
| 12,075,539 | B2* | 8/2024 | Zhang .................... H05B 45/14 |
| 2003/0076049 | A1* | 4/2003 | Kawada ............... G09G 3/2932 315/169.4 |
| 2006/0176253 | A1 | 8/2006 | Yazawa et al. |
| 2007/0216322 | A1 | 9/2007 | Kim |
| 2010/0327772 | A1* | 12/2010 | Lee .................... H05B 45/3725 315/297 |
| 2012/0025721 | A1* | 2/2012 | He ........................ H05B 45/44 315/185 R |
| 2015/0115819 | A1* | 4/2015 | Park ...................... H05B 45/00 315/193 |
| 2019/0027089 | A1* | 1/2019 | Moribe ................ G09G 3/2003 |
| 2019/0088199 | A1* | 3/2019 | Zhang ................. G09G 3/3208 |
| 2022/0167477 | A1* | 5/2022 | Lee ........................ H05B 45/10 |
| 2022/0276533 | A1 | 9/2022 | Lee et al. |
| 2022/0322511 | A1* | 10/2022 | Zhang ................. G09G 3/3406 |
| 2024/0096258 | A1 | 3/2024 | Pyun et al. |

FOREIGN PATENT DOCUMENTS

| | | |
|---|---|---|
| JP | 2009-295791 A | 12/2009 |
| KR | 10-2006-0089375 A | 8/2006 |
| KR | 10-2007-0093761 A | 9/2007 |
| KR | 10-0941509 B1 | 2/2010 |
| KR | 10-2010-0085933 A | 7/2010 |
| KR | 10-2018-0034736 A | 4/2018 |
| KR | 10-2020-0106637 A | 9/2020 |
| KR | 10-2021-0008246 A | 1/2021 |
| KR | 10-2021-0078574 A | 6/2021 |
| KR | 10-2021-0078617 A | 6/2021 |

OTHER PUBLICATIONS

Written Opinion (PCT/ISA/237) issued on Jun. 26, 2023 by the International Searching Authority in International Application No. PCT/KR2023/003156.

* cited by examiner

FIG. 8

| DISPLAY SIZE | 50INCHES | 55INCHES | 60INCHES | 65INCHES | 70INCHES | 75INCHES |
|---|---|---|---|---|---|---|
| FORWARD VOLTAGE (Vf) | 44 | 46 | 48 | 50 | 52 | 54 |
| VOLTAGE FOR OPERATION($V_{LED}$) | 48 | 50 | 52 | 54 | 56 | 58 |

FIG. 9

| DISPLAY SIZE | 50INCHES | 55INCHES | 60INCHES | 65INCHES | 70INCHES | 75INCHES |
|---|---|---|---|---|---|---|
| VOLTAGE FOR OPERATION ($V_{LED}$) | 48 | 50 | 52 | 54 | 56 | 58 |
| MAXIMUM FORWARD VOLTAGE (Vf_max) | 47.5 | 48.5 | 50.0 | 52.5 | 54.5 | 55.5 |
| MARGIN VOLTAGE ($V_{LED}$ -Vf_max) | 0.5 | 1.5 | 2 | 1.5 | 1.5 | 2.5 |

FIG. 10

| DISPLAY SIZE | 50INCHES | 55INCHES | 60INCHES | 65INCHES | 70INCHES | 75INCHES |
|---|---|---|---|---|---|---|
| FORWARD VOLTAGE (Vf) | 44 | 46 | 48 | 50 | 52 | 54 |
| UPDATED VOLTAGE FOR OPERATION ($V_{LED'}$) | 49.5 | 51.5 | 54 | 55.5 | 57.5 | 60.5 |

DISPLAY APPARATUS AND CONTROL METHOD THEREOF

CROSS-REFERENCE TO RELATED APPLICATIONS

This application is a continuation application of International Application No. PCT/KR2023/003156 designating the United States, filed on Mar. 8, 2023, in the Korean Intellectual Property Receiving Office, which claims priority from Korean Patent Application No. 10-2022-0043568, filed on Apr. 7, 2022, in the Korean Intellectual Property Office, the disclosures of which are hereby incorporated by reference herein in their entireties.

BACKGROUND

1. Field

The disclosure relates to a display apparatus and method of controlling the same for reducing the flicker phenomenon that occurs in an LED display apparatus.

2. Description of Related Art

In general, the display apparatus includes a backlight unit and a liquid crystal panel for converting electrical information into visual information for display by controlling an amount of light irradiated from the backlight unit passing through the liquid crystal panel.

The backlight unit may include capacitors and may be controlled in an active matrix method, in which case the efficiency may increase due to low current application but the lack of margin voltage causes the flicker phenomenon.

SUMMARY

The disclosure provides an electronic device and method for controlling the same, by which a margin of a voltage to be applied to an LED module of a backlight unit is secured to prevent the flicker phenomenon.

According to one or more example embodiments, a display apparatus may include: at least one light emitting diode (LED) block including LEDs connected in series; a driver integrated circuit (IC) configured to apply a voltage to the at least one LED block; at least one processor; and memory storing at least one instruction that, when executed by the at least one processor, cause the display apparatus to: detect at least one forward voltage of the at least one LED block, respectively, based on a first voltage being applied to the at least one LED block; determine a margin voltage based on a difference between the first voltage and the at least one forward voltage; determine a second voltage to be applied to the at least one LED block based on the first voltage and the margin voltage. The at least one instruction may further cause the display apparatus to: detect a maximum value of the at least one forward voltage; and determine the margin voltage based on a difference between the first voltage and the maximum value of the at least one forward voltage.

The at least one instruction may further cause the display apparatus to determine the second voltage based on the margin voltage below a preset reference value.

The at least one instruction may further cause the display apparatus to determine the second voltage by adding the margin voltage to the first voltage.

The at least one instruction may further cause the display apparatus to control the driver IC to drive the at least one LED block based on the second voltage.

The first voltage may have a value stored in a lookup table of the memory.

The at least one instruction may further cause the display apparatus to update the lookup table by changing the first voltage to the second voltage.

The at least one instruction may further cause the display apparatus to control the driver IC to drive the at least one LED block based on the updated lookup table.

The display apparatus further may include a voltage sensor. The at least one instruction may further cause the display apparatus to determine the second voltage to be applied to the at least one LED block by detecting at least one forward voltage of the at least one LED blocks from the voltage sensor.

The at least one instruction may further cause the display apparatus to determine the second voltage to be applied to the at least one LED block by detecting the at least one forward voltage.

According to one or more example embodiments, a method of controlling a display apparatus, may include: applying a first voltage to at least one LED block including LEDs connected in series; detecting at least one forward voltage of the at least one LED block, respectively, based on the first voltage being applied to the at least one LED block; determining a margin voltage based on a difference between the first voltage and the at least one forward voltage; determining a second voltage to be applied to the at least one LED block based on the first voltage and the margin voltage.

The determining of the margin voltage may include: detecting a maximum value of the at least one forward voltage; and determining the margin voltage based on a difference between the first voltage and the maximum value of the at least one forward voltage.

The determining of the second voltage may include determining the second voltage based on the margin voltage below a preset reference value.

The determining of the second voltage may include determining the second voltage by adding the margin voltage to the first voltage.

The method further may include controlling a driver IC to drive the at least one LED block based on the second voltage.

BRIEF DESCRIPTION OF THE DRAWINGS

FIG. 8 illustrates an initial state of a lookup table, according to one or more embodiments of the disclosure.

FIG. 9 illustrates margin voltages calculated by a processor, according to one or more embodiments of the disclosure.

FIG. 10 illustrates an updated result of a lookup table, according to one or more embodiments of the disclosure.

DETAILED DESCRIPTION

Figure 1:
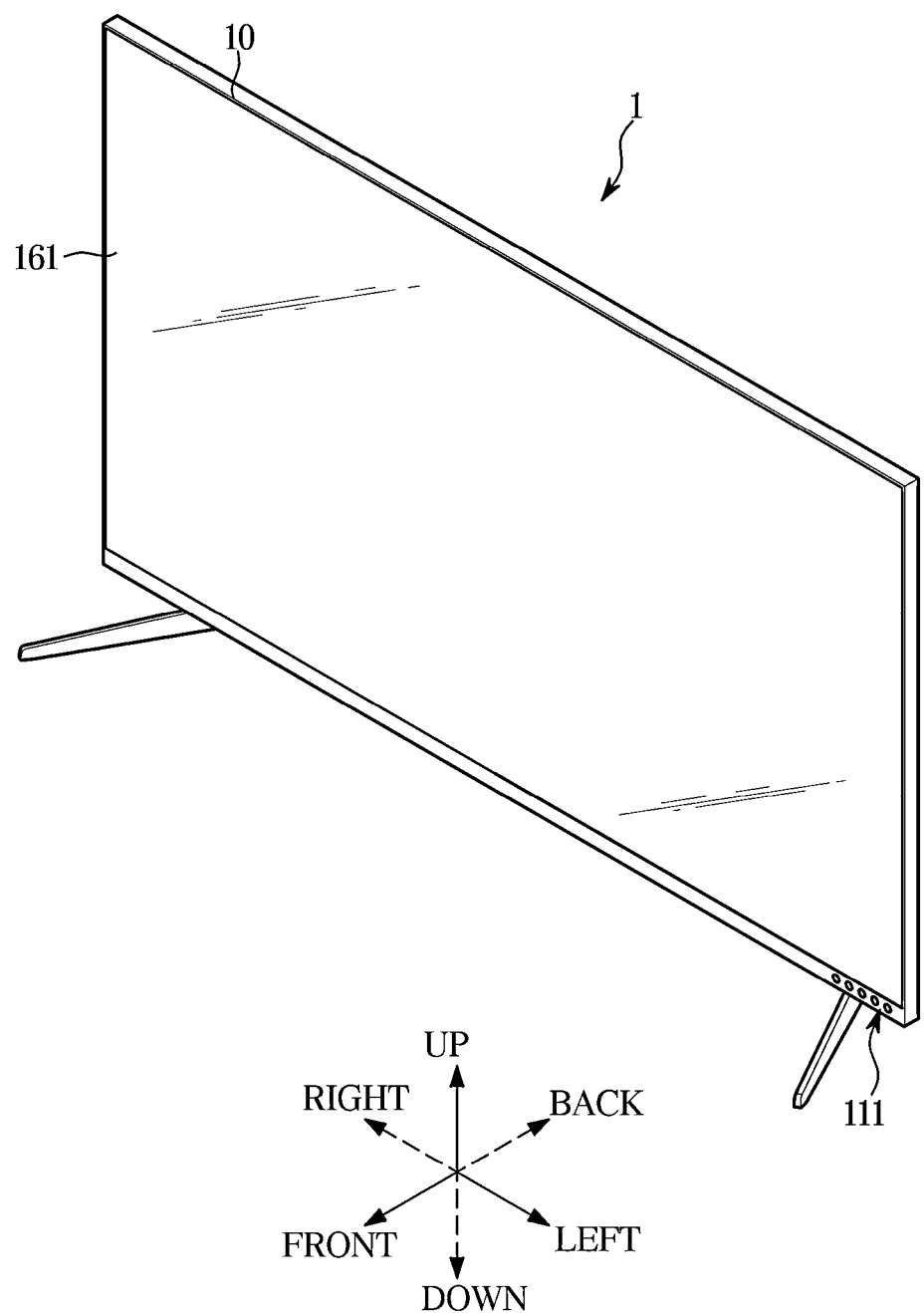
FIG. 1 is an exterior view of a display apparatus, according to one or more embodiments of the disclosure.

Embodiments and features as described and illustrated in the disclosure are merely examples, and there may be various modifications replacing the embodiments and drawings at the time of filing this application.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~and/or~," or the like.

Furthermore, the terms, such as "~part", "~block", "~member", "~module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Reference numerals used for method steps are just used to identify the respective steps, but not to limit an order of the steps. Thus, unless the context clearly dictates otherwise, the written order may also be practiced otherwise.

Meanwhile, the embodiments of the disclosure may be implemented in the form of a recording medium for storing instructions to be carried out by a computer. The instructions may be stored in the form of program codes, and when executed by a processor 121, may perform operations in the embodiments of the disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

A display apparatus 1 and method of controlling the display apparatus 1 will now be described in detail with reference to accompanying drawings.

Figure 2:
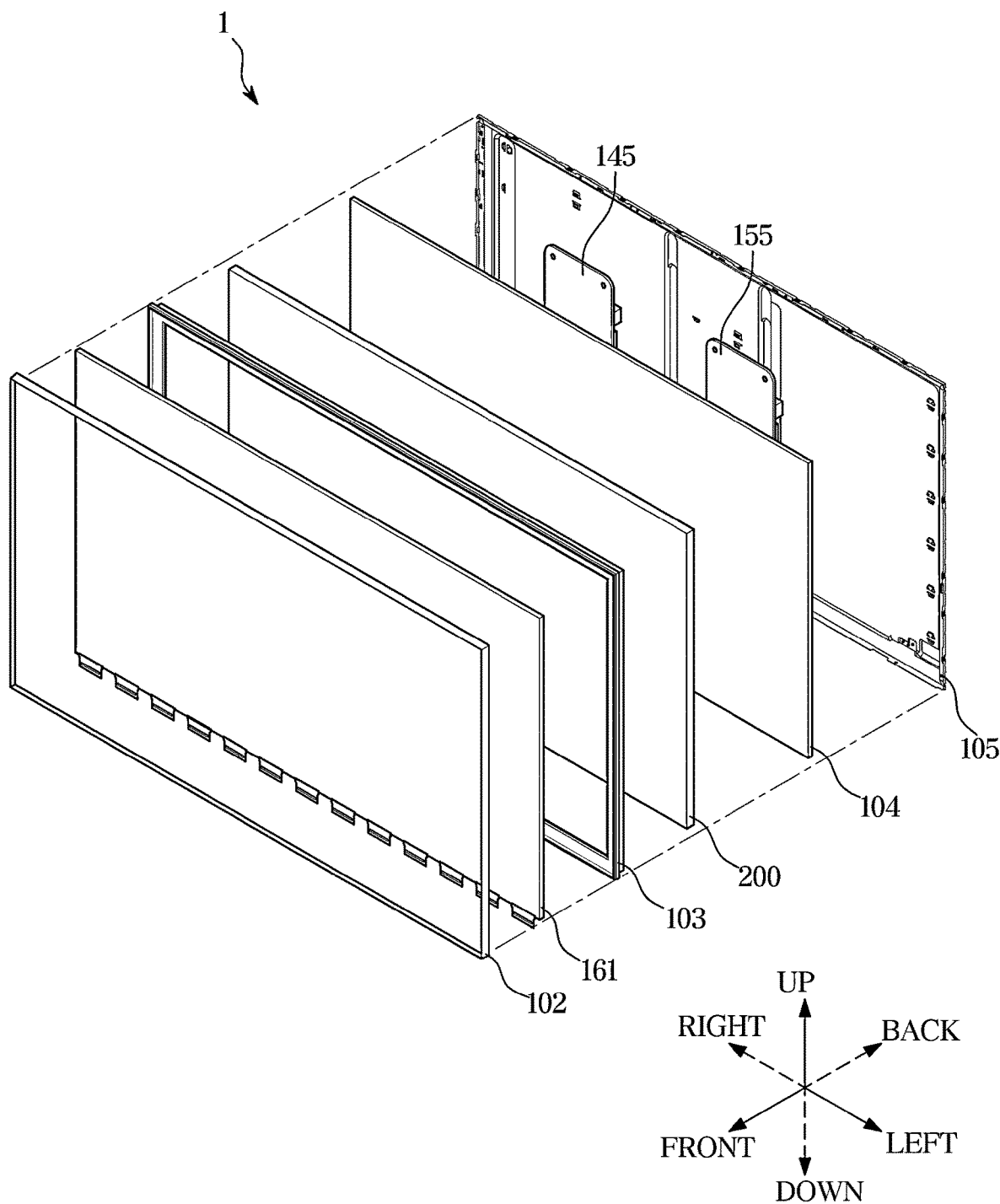
FIG. 2 is an exploded view of a display apparatus, according to one or more embodiments of the disclosure.
Figure 3:
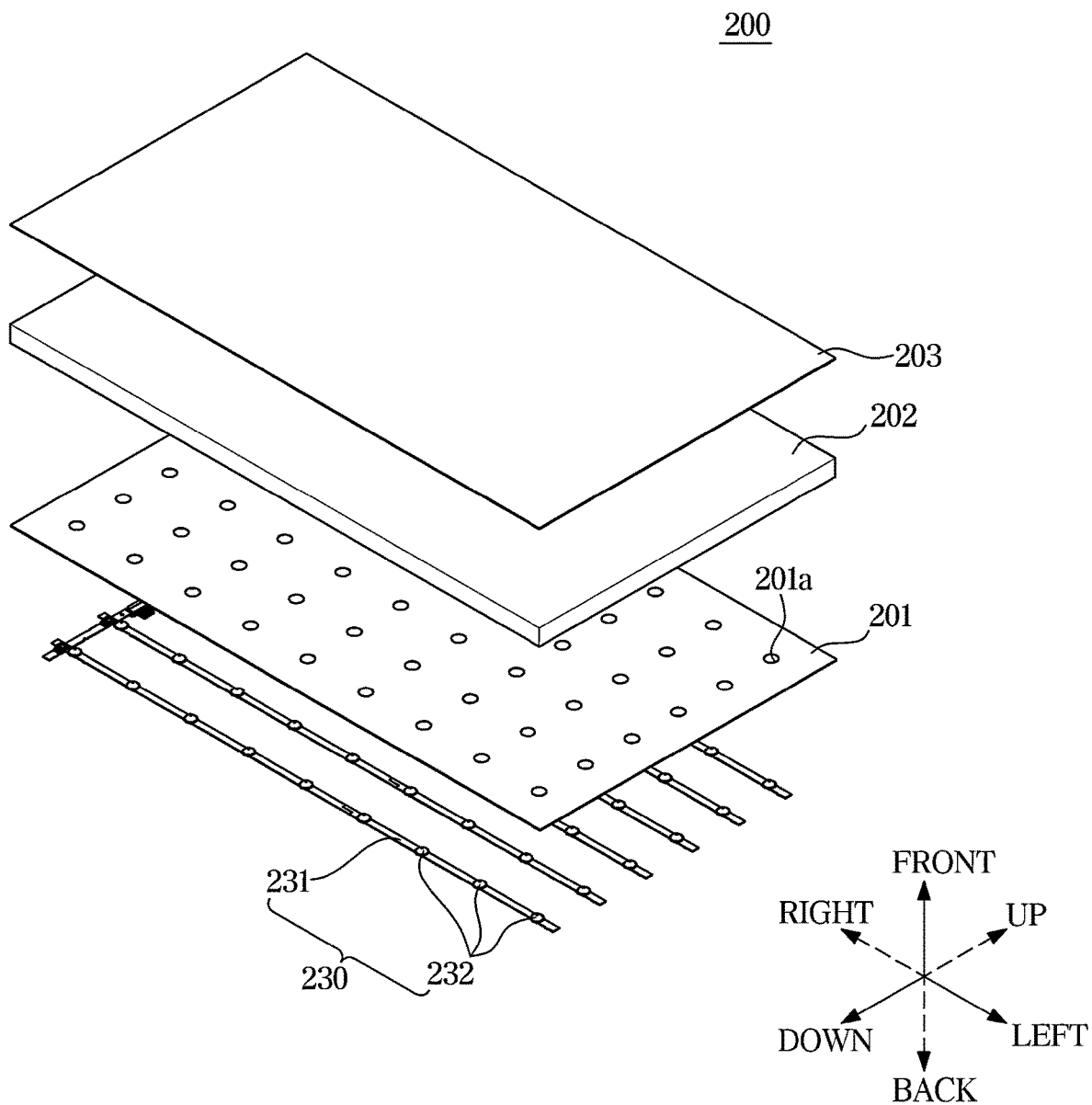
FIG. 3 is an exploded view of a backlight unit, according to one or more embodiments of the disclosure.

FIG. 1 is an exterior view of a display apparatus, according to one or more embodiments of the disclosure, FIG. 2 is an exploded view of a display apparatus, according to one or more embodiments of the disclosure, and FIG. 3 is an exploded view of a backlight unit, according to one or more embodiments of the disclosure.

Referring to FIG. 1, the display apparatus 1 is a device that is able to process image data received from the outside and visually present the image.

As shown in FIG. 1, the display apparatus 1 may be implemented as a TV, but is not limited thereto. For example, the display apparatus 1 may be implemented as a monitor of a computer, or may be included in a GPS terminal system or many different types of portable terminal devices. The portable terminal device may correspond to a laptop computer, a smart phone, a tablet PC, a personal digital assistant (PDA), etc.

The display apparatus 1 includes a main body 10 that defines an exterior and receives or supports various components that make up the display apparatus 1, and a liquid crystal panel 131 for displaying an image.

Input buttons 111 may be arranged on the main body 10 to receive a command from the user for power on/off, volume control, channel tuning, screen mode switching, etc., of the display apparatus 1. Furthermore, apart from the input buttons 111 arranged on the main body 10, a remote controller may be provided to receive a command from the user regarding control over the display apparatus 1.

Various constituent parts for displaying images on the liquid crystal panel 131 may be arranged in the main body 10.

For example, the main body 10 includes, as shown in FIG. 2, a backlight unit 200 for emitting surface light in the forward direction, a liquid crystal panel 131 for blocking or passing the light emitted from the backlight unit 200, a power assembly 145 for supplying power to the liquid crystal panel 131 and the backlight unit 200, and a control assembly 155 for controlling operations of the liquid crystal panel 131 and the backlight unit 200.

The main body 10 also includes a bezel 102, a frame middle mold 103, a bottom chassis 104 and a rear cover 105. The bezel 102, the frame middle mold 103, the bottom chassis 104 and the rear cover 105 support and secure the power assembly 145, the control assembly 155, the liquid crystal panel 131 and the backlight unit 200.

In general, the liquid crystal panel 131 displays image data by applying a grayscale voltage to a liquid crystal layer with a liquid crystal material having an anisotropic dielectric constant injected between two substrates to control the amount of light transmitted through the substrate.

The liquid crystal panel 131 may be comprised of pixels. The pixel is a minimum unit that constitutes a screen displayed through the liquid crystal panel 131 and is also referred to as a dot.

Each pixel may receive an electric signal representing image data, and output an optical signal corresponding to the received electric signal. Optical signals output from a plurality of pixels included in the liquid crystal panel 131 may be combined into image data displayed on the liquid crystal panel 131.

In this case, each pixel is equipped with a pixel electrode and connected to a gate line and a source line. The gate line and the source line may be configured in an existing method known to those of ordinary skill in the art, and the detailed description thereof will be omitted.

Furthermore, the liquid crystal panel 131 is not self-luminous, so the display apparatus 1 may include the backlight unit 200 to project backlight onto the liquid crystal panel 131, as described above.

Hence, the display apparatus 1 may display desired image data by controlling the intensity of a grayscale voltage to be applied to the liquid crystal layer of the liquid crystal panel 131 to control the transmittance of the backlight passing through the liquid crystal layer.

The backlight unit 200 may be implemented in a direct type or an edge type, or may be implemented in various types known to those of ordinary skill in the art. The direct type of backlight unit 200 will now be described as an example. Embodiments of the disclosure are not, however, limited to the example, and the backlight unit 200 may be implemented in various types already known to the public.

As shown in FIG. 3, the backlight unit 200 may include a light emitting device array 230 that produces light, a reflection sheet 201 for reflecting light, a diffuser plate 202 for diffusing light, and an optical sheet 203 for enhancing brightness of light.

The light emitting device array 230 may be arranged in the rearmost section of the backlight unit 200 and may include a plurality of sub-blocks 232, which are LED blocks. The sub-block 232 may include at least one light emitting device that produces light, and each sub-block 232 may include a separate driving circuit. The plurality of sub-blocks 232 may be arranged to be parallel to each other to face the liquid crystal panel 131, and emit light forward.

Furthermore, the light emitting device array 230 may include supporting bodies 231 that support and secure the plurality of sub-blocks 232.

The plurality of sub-blocks 232 may be mounted in a preset array to have uniform brightness. For example, the plurality of sub-blocks 232 may be equidistantly mounted on the supporting bodies 231. There are various forms in which the plurality of sub-blocks 232 are arranged on the supporting bodies 231.

In this case, the supporting bodies 231 may supply power to the plurality of sub-blocks 232. A current may be applied and power is supplied to the light emitting devices included in each of the plurality of sub-blocks 232 through the supporting body 231. The supporting bodies 412 may be formed of a synthetic resin including conductive power supply lines or a printed circuit board (PCB) to supply power to the plurality of sub-blocks 232.

In one or more embodiments, unlike what is shown in FIG. 3, the display apparatus may include a substrate to support/secure the plurality of sub-blocks 232 instead of the supporting bodies 231.

Specifically, the plurality of sub-blocks 232 may be arranged in preset patterns to emit light with uniform brightness, and the plurality of sub-blocks 232 may be arranged so that one light emitting device is at the same distance from neighboring light emitting devices.

For example, the plurality of light emitting devices included in the plurality of sub-blocks 232 may be arranged in rows and columns. Accordingly, the plurality of light emitting devices may be arranged such that neighboring four light emitting devices form almost a square. Furthermore, one light emitting device may be located to be adjacent to four other light emitting devices, and the distances between the light emitting device and the four neighboring light emitting devices may be almost the same.

In another example, the plurality of light emitting devices may be arranged in multiple rows, and a light emitting device belonging to a row may be placed in the middle of two light emitting devices belonging to two neighboring rows. Accordingly, the plurality of light emitting devices may be arranged such that neighboring three light emitting devices form almost an equilateral triangle. In this case, one light emitting device may be located to be adjacent to six other light emitting devices, and the distances between the light emitting device and the six neighboring light emitting devices may be almost the same.

The layout of the plurality of light emitting devices is not, however, limited thereto, and the plurality of light emitting devices may be arranged in various ways to emit light with uniform brightness.

A light emitting device included in each of the plurality of sub-blocks 232 may be one of a light emitting diode (LED), an organic LED (OLED) or a quantum dot-organic LED (QD-OLED), which is self-luminous based on an applied current. The type of the light emitting device is not, however, limited thereto, and any device that emits light according to a current may be included without limitation.

The reflection sheet 201 may be arranged in front of the light emitting device array 230 and may reflect light that travels in the rearward direction of the backlight unit 200 to the front.

Through holes 201a are formed on the reflection sheet 201 at locations corresponding to the sub-blocks 232. Furthermore, the light emitting devices of the sub-block 232 may pass through the through holes 201a and protrude forward from the reflection sheet 201. As the light emitting device of the sub-block 232 emits light in many different directions from the front of the reflection sheet 201, part of light emitted from the light emitting device may proceed rearward. A reflection film included on the reflection sheet 201 may reflect the light emitted rearward from the light emitting device to the front.

The diffuser plate 204 may be arranged in front of the light emitting device array 230 and the reflection sheet 201 to uniformly diffuse the light emitted from the light emitting devices of the light emitting device array 230.

The light emitting devices are located all over the rear surface of the backlight unit 200. Even though the plurality of light emitting devices are equidistantly arranged on the rear surface of the backlight unit 200, there may be differences in brightness depending on the locations of the light emitting devices. To eliminate the differences in brightness due to the light emitting devices, the diffuser plate 204 may diffuse the light emitted from the light emitting devices inside the diffuser plate 204. Accordingly, the diffuser plate 204 may uniformly emit light incident from the light emitting device array 230 to the front.

The diffuser plate 204 may be formed of poly-methyl methacrylate (PMMA) or transparent polycarbonate (PC) with a diffuser agent added thereto for light diffusion.

An optical sheet 203 may include various sheets to improve brightness and uniformity of the brightness. For example, the optical sheet 203 may include a diffuser sheet, a first prism sheet, a second prism sheet and a reflective polarizer sheet.

In one or more embodiments, the backlight unit 200 may further include a quantum dot film capable of converting the color of the light emitted from the light emitting device. In this case, the quantum dot film may be arranged between the diffuser plate 202 and the optical sheet 203. Besides, the backlight unit 200 may include various sheets in some embodiments.

The physical structure of the display apparatus 1 has thus far been described. Each component of the display apparatus 1 will now be described in detail, and how to control the backlight unit 200 to prevent the flicker phenomenon will be described.

Figure 4:
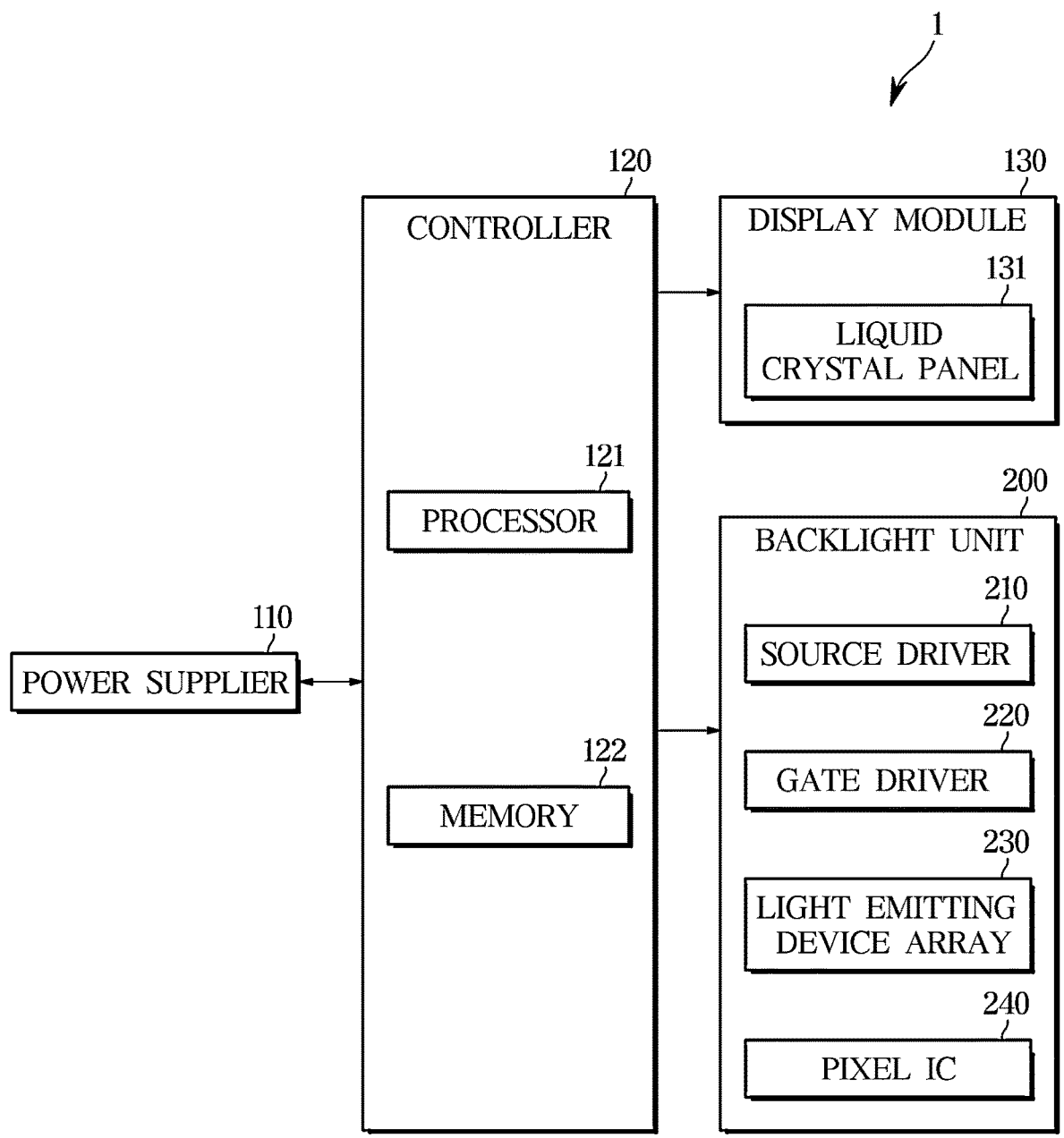
FIG. 4 is a control block diagram of a display apparatus, according to one or more embodiments of the disclosure.
Figure 5:
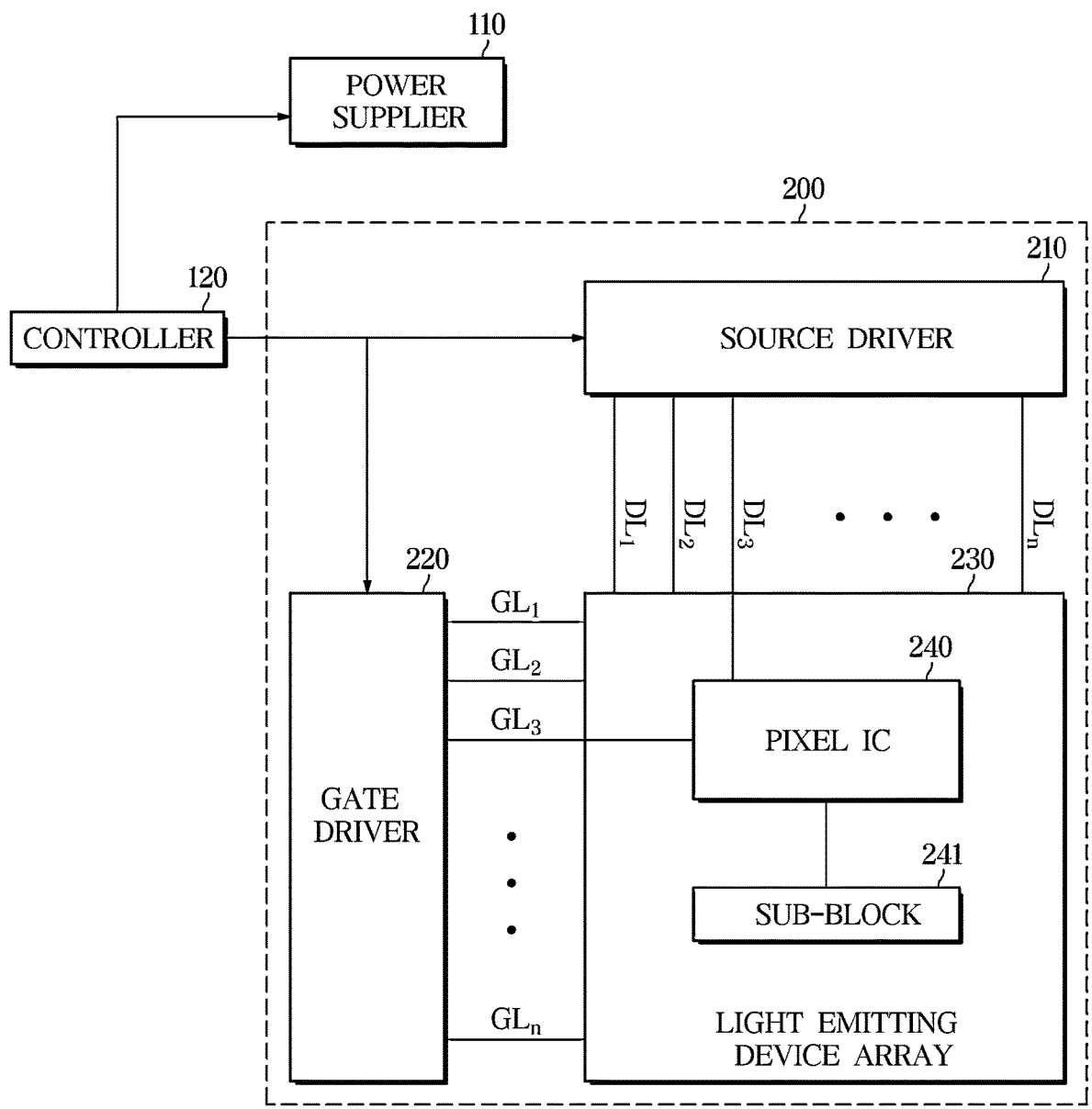
FIG. 5 is a detailed control block diagram of a display apparatus, according to one or more embodiments of the disclosure.

FIG. 4 is a control block diagram of a display apparatus, according to one or more embodiments of the disclosure, and FIG. 5 is a detailed control block diagram of a display apparatus, according to one or more embodiments of the disclosure.

Referring to FIG. 4, in one or more embodiments, the display apparatus 1 may include a power supplier 110 for supplying power to each component of the display apparatus 1, a controller 120 for processing a content received from the outside and controlling the respective components to output an image and sound corresponding to the content, a display module 130 including the liquid crystal panel 131 for displaying the image corresponding to the content and the backlight unit 200 for supplying backlight. However, in another embodiment, the display apparatus 1 may omit some of the aforementioned components or further include other components such as an input module, a sound output module, etc.

In one or more embodiments, the power supplier 110 may supply power to each component of the display apparatus 1.

For example, the power supplier 110 may supply power to the display module 130. Specifically, the power supplier 110 may apply a driving voltage for each of a source driver and a gate driver of the display module 130, and apply a common voltage required for the liquid crystal layer of the liquid crystal panel 131 through each pixel electrode.

Furthermore, the power supplier 110 may supply power to the backlight unit 200. Specifically, the power supplier 110 may apply a driving voltage to each of a source driver 210, a gate driver 220 and a pixel IC 240 of the backlight unit 200, and transmit the voltage to the light emitting device array 230. The supplying of power to the backlight unit 200 will be described later in more detail.

The power supplier 110 may include a DC-to-DC converter and a PWM driver, may be provided in the form of a separate integrated circuit (IC), and may correspond to the power assembly 145.

In one or more embodiments, the controller 120 may include at least one memory 152 for storing a program for carrying out the aforementioned and following operations, and at least one processor 121 for executing the stored program.

In one or more embodiments, the processor 121 may process the content received through a content receiver or communicator to obtain image data corresponding to the content.

Furthermore, in one or more embodiments, the processor 121 may control the display module 130 and the backlight unit 200 to display a corresponding image based on the image data.

In one or more embodiments, the processor 121 may determine brightness corresponding to each of the plurality of sub-blocks 232 included in the backlight unit 200 based on the image data. In other words, the processor 121 may determine brightness required for each sub-block 232 based on the image data.

Specifically, the processor 121 may determine a grayscale corresponding to each pixel of the liquid crystal panel 131 based on the image data, and determine brightness for the sub-block 232 corresponding to each pixel of the liquid crystal panel 131 based on the determined grayscale.

In other words, the sub-block 232 of the backlight unit 200 that emits light to a pixel requiring a low grayscale may be determined as requiring low brightness, and the sub-block 232 of the backlight unit 200 that emits light to a pixel requiring a high grayscale may be determined as requiring high brightness.

The determining of brightness for each of the plurality of sub-blocks 232 of the backlight unit 200 may be performed on a frame basis.

In one or more embodiments, the processor 121 may determine a source voltage corresponding to each sub-block 232 in order to irradiate light with the brightness required by the sub-block 232.

In this case, in addition to the source voltage, the processor 121 may determine an extra peak voltage to support instantaneous high brightness for a high dynamic range (HDR) function.

In one or more embodiments, the memory 152 may store a lookup table that stores voltage for operation depending on the size of the display apparatus 1.

The memory 152 may be implemented with at least one of a non-volatile memory device such as cache, read only memory (ROM), programmable ROM (PROM), erasable programmable ROM (EPROM), electrically erasable programmable ROM (EEPROM) and flash memory, or a volatile memory device such as random access memory (RAM) for storing various information. It is not, however, limited thereto, and the memory 152 may have any type that is capable of storing various information.

In one or more embodiments, the display module 130 may display an image by receiving image data from the controller 120 and operate the liquid crystal panel 131 based on the received image data.

For this, the display module 130 may a source driver, a gate driver, and a timing controller for controlling general operation of the source driver and the gate driver by sending a gate control signal and a source control signal.

Furthermore, the display module 130 may include the liquid crystal panel 131 including multiple gate lines for sending gate signals, multiple source lines formed to cross the gate lines and sending grayscale voltages, and multiple pixel electrodes in the form of a matrix, which are formed in an area enclosed by the gate lines and the source lines and connected to them through switching devices that serve as switches between the gate lines and the source lines.

In one or more embodiments, the backlight unit 200 may include the light emitting device array 230 for irradiating light to the liquid crystal panel 131, the source driver 210 for applying a source voltage to the light emitting device array 230 and a gate driver 220 for sending gate signals to the light emitting device array 230.

Furthermore, in one or more embodiments, the backlight unit 200 may include a timing controller for performing timing control for the source driver 210 and the gate driver 220, and the timing controller may be provided in an IC integrated with the controller 120 or as a separate IC. In the following description, it is assumed that the controller 120 performs the function of the timing controller as well.

A shown in FIG. 5, the backlight unit 200 includes multiple gate lines $GL_1, GL_2, GL_3, \ldots, GL_m$ that send gate signals, multiple source lines $DL_1, DL_2, DL_3, \ldots, DL_n$ that are formed to cross the gate lines $GL_1, GL_2, GL_3, \ldots, GL_m$ and that send source voltages, and the light emitting device array 230 including multiple sub-blocks 232 in the form of a matrix, which are formed in an area enclosed by the gate lines $GL_1, GL_2, GL_3, \ldots, GL_m$ and the source lines $DL_1, DL_2, DL_3, \ldots, DL_n$ and connected to them through switching devices that serve as switches between the gate lines $GL_1, GL_2, GL_3, \ldots, GL_m$ and the source lines $DL_1, DL_2, DL_3, \ldots, DL_n$.

In other words, the light emitting device array 230 may include the plurality of sub-blocks 232 each connected to one gate line and one source line, and each of the plurality of sub-blocks 232 may include the pixel IC 240 that applies a current to the light emitting device based on the gate signal and the source voltage.

In one or more embodiments, the source driver 210 may set output timing of the source voltage, a magnitude of the source voltage, and the polarity according to the source control signal and the image data input from the controller 120, and output a suitable source voltage through the source lines $DL_1$, $DL_2$, $DL_3$, . . . , $DL_n$ according to application timing.

Specifically, the source driver 210 may apply a source voltage corresponding to brightness required by each sub-block 232 to the corresponding sub-block 232 via the pixel IC 240 through the corresponding source line, under the control of the controller 120.

In other words, the source driver 210 may convert brightness data corresponding to the image data received from the controller 120 into an analog source voltage to be applied to each of the source lines $DL_1$, $DL_2$, $DL_3$, . . . , $DL_n$ arranged on the light emitting device array 230, based on the driving voltage applied from the power supplier 110.

The source driver 210 may include at least one source driver ICs, the number of which may be determined according to specifications of the light emitting device array 230 such as the size, resolution, etc.

In one or more embodiments, the gate driver 220 may be connected to one or both ends of the gate lines $GL_1$, $GL_2$, $GL_3$, . . . , $GL_m$, may use the gate control signal provided from the controller 120 and gate on/off voltages applied from the voltage supplier 140 to generate a plurality of gate signals, and may apply the gate signals to the gate lines $GL_1$, $GL_2$, $GL_3$ . . . , $GL_m$ arranged on the light emitting device array 230.

The gate driver 220 may include at least one gate driver ICs, which may be determined according to specifications of the light emitting device array 230 such as the size, resolution, etc.

Specifically, the gate driver IC of the gate driver 220 may receive a gate control signal to apply sequential on/off voltages, i.e., on/off signals, through the gate lines. Accordingly, the gate driver IC may sequentially turn on/off the switching devices connected to the gate lines.

Hence, the brightness data to be indicated to the sub-block 232 connected to the gate line is converted into a source voltage classified into multiple voltages and applied to each source line. In this case, during one frame cycle, gate signals are sequentially applied to all the gate lines, so the source voltages corresponding to the brightness data are applied to all the lines of the sub-blocks 232 so that the light emitting device array 230 may provide backlight corresponding to one frame to the liquid crystal panel 131.

In one or more embodiments, the light emitting device array 230 may include a plurality of light emitting devices arranged in the form of a matrix.

The light emitting device array 230 may include the plurality of sub-blocks 232 each including at least one light emitting device. Furthermore, the light emitting device array 230 may include the pixel IC 240 that controls the plurality of sub-blocks 232.

Specifically, the at least one sub-block 232 may be connected to the pixel IC 240, and the pixel IC 240 may be connected to one gate line and one source line to receive a gate signal and a source voltage to control the connected light emitting device.

In this case, one pixel IC 240 may be connected to six LED blocks, which are six sub-blocks 232, and nine LED devices may be connected in series in one LED block.

An active matrix (AM) method that operates the light emitting device array 230 will now be described in detail.

Figure 6:
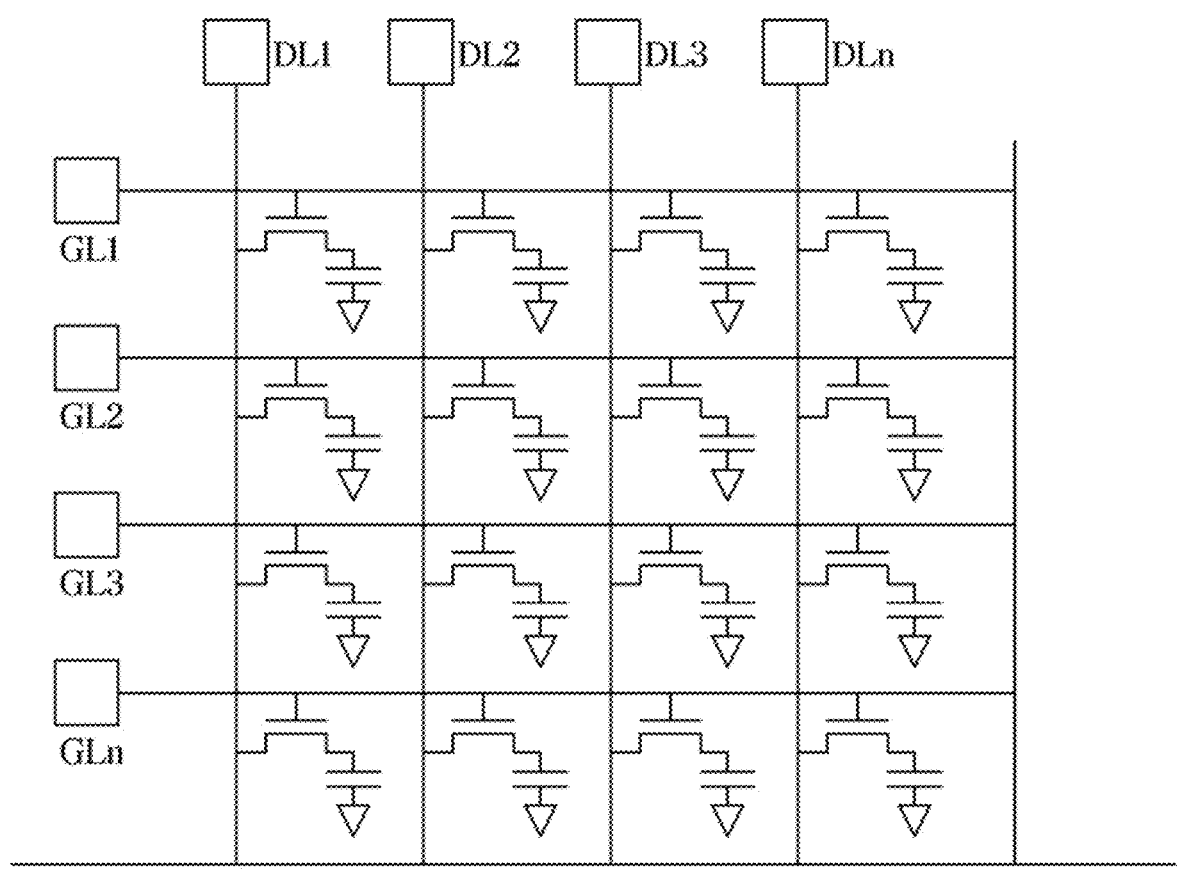
FIG. 6 illustrates a driving method, according to one or more embodiments of the disclosure.

FIG. 6 illustrates a driving method, according to one or more embodiments of the disclosure.

As described above in connection with FIGS. 4 and 5, light emitting devices of the display apparatus 1 according to one or more embodiments may include light emitting diodes (LEDs), and the light emitting device array 230 may correspond to the AM method by which gate lines GL1 to GLn and data lines DL1 to DLn are arranged in the form of a matrix and include capacitors.

The AM method is capable of directly operating an individual pixel by having a semiconductor device, i.e., a thin film transistor (TFT), and an electrode in each pixel.

The AM method may further employ a capacitor that stores information for operating the pixel during one frame.

In the AM method, a signal input for one frame may be stored in the capacitor, so the signal on the corresponding line may not be turned off but may remain for one frame even when the next line is selected.

The AM method has an advantage of high response speed, which is one frame time shorter than a passive matrix (PM) method or direct method by which signals are sequentially input to the respective lines to emit light.

However, when the display apparatus 1 is operated in the AM method, the flicker phenomenon is likely to occur due to the lack of a margin voltage. This will be described in more detail with reference to FIG. 7.

Figure 7:
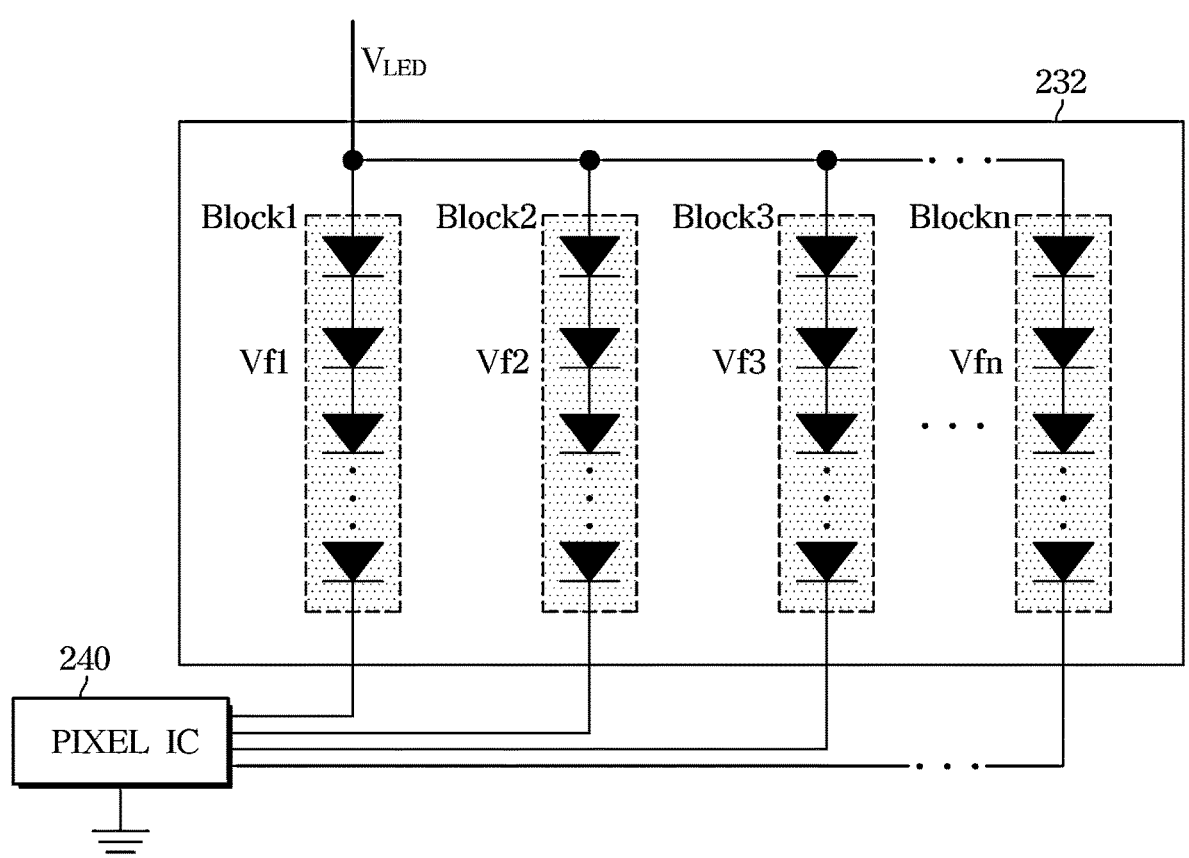
FIG. 7 is a schematic circuit diagram of a display apparatus, according to one or more embodiments of the disclosure.

FIG. 7 is a schematic circuit diagram of a display apparatus, according to one or more embodiments of the disclosure.

Referring to FIG. 7, sub-blocks may be connected to the pixel IC 240 as shown in FIG. 5, and each sub-block may be controlled by the pixel IC 240. In this case, in an LED block, which is a sub-block, at least one LED may be connected in series to each other, and it is common to have nine LEDs for one LED block but is not limited thereto.

At least one LED block may be controlled directly by the driver IC, but for efficient control, six LED blocks may be controlled by one pixel IC 240. In other words, a plurality of LEDs belonging to the same LED block may form a group.

The plurality of LEDs belonging to one LED block may be connected in series to receive the same current. Furthermore, the plurality of LED blocks may be connected in parallel to receive the same voltage, which may be referred to as a first voltage $V_{LED}$, which is a voltage for operation.

The first voltage $V_{LED}$ may refer to a sum of a voltage to operate LED devices and a voltage to operate the pixel IC 240, which may be calculated in advance to operate the LED module.

In the traditional technology, an LED module is operated at the first voltage $V_{LED}$ in the AM method, but a distribution of forward voltage Vf values caused by a change in physical characteristics of LED devices is not predicted.

Hence, when a margin voltage, a difference between the forward voltage Vf of the LED device and the first voltage $V_{LED}$ decreases below a certain level with an increase of the forward voltage Vf of the LED device, the voltage applied to the pixel IC 240 is reduced, resulting in the flicker phenomenon where the backlight unit 200 flickers unstably.

On the other hand, in one or more embodiments, the processor 121 detects the forward voltage Vf of each LED block by applying the first voltage $V_{LED}$ to the plurality of LED blocks in the beginning of the operation, and determine a margin voltage $V_{LED}$–Vf based on the difference between the first voltage $V_{LED}$ and the forward voltage Vf.

When the calculated margin voltage $V_{LED}$-Vf is below a certain value, the processor 121 may determine a second voltage $V_{LED}$' by adding the margin voltage $V_{LED}$-Vf to the first voltage $V_{LED}$.

Accordingly, the processor 121 may operate the display apparatus 1 at the second voltage $V_{LED}$' that prevents the flicker phenomenon by compensating the first voltage $V_{LED}$. In other words, pixel IC 240 or driver IC may apply second voltage $V_{LED}$' to the plurality of LED blocks.

Specifically, the processor 121 may apply the first voltage $V_{LED}$ to the LED module and detect the forward voltage Vf of each LED block. For example, the processor 121 may detect a forward voltage Vf1 of a plurality of LEDs belonging to the first block Block1, a forward voltage Vf2 of a plurality of LEDs belonging to the second block Block2, a forward voltage Vf3 of a plurality of LEDs belonging to the third block Block3, and a forward voltage Vf4 of a plurality of LEDs belonging to the fourth block Block4, respectively.

In this case, the processor 121 may detect the forward voltage Vfn of each LED block by using an extra voltage sensor or current sensor, or an extra processor 121 may be additionally equipped to detect the forward voltage Vfn of each LED block.

The detecting of the forward voltage Vfn by the processor 121 is not limited to using the extra sensor or extra processor 121, but may be performed by any method including the traditional method, as long as the method is able to detect a sum of forward voltages of the LED devices in the LED block.

The processor 121 may detect the forward voltage Vfn of each LED block by applying the first voltage $V_{LED}$ and detect a maximum value of the forward voltages Vfn of the respective LED blocks.

The processor 121 may determine a difference between the maximum value Vf_max of the forward voltages Vfn of the respective LED blocks and the first voltage $V_{LED}$ as the margin voltage $V_{LED}$-Vf_max.

When the processor 121 determines the difference between the maximum value Vf_max of the forward voltages Vfn and the first voltage $V_{LED}$ as the margin voltage $V_{LED}$-Vf_max, compensation of the first voltage $V_{LED}$ is made based on an LED block having the least margin voltage $V_{LED}$-Vf_max, thereby gaining an effect of reducing an unnecessary voltage waste.

In one or more embodiments, the compensating of the first voltage $V_{LED}$ into the second voltage $V_{LED}$' by the processor 121 of the display apparatus 1 may be based on information stored in a lookup table, which will now be described in detail.

FIG. 8 illustrates an initial state of a lookup table, according to one or more embodiments of the disclosure, FIG. 9 illustrates margin voltages calculated by the processor 121, according to one or more embodiments of the disclosure, and FIG. 10 illustrates an updated result of a lookup table, according to one or more embodiments of the disclosure.

Referring to FIG. 8, a lookup table of the forward voltages Vf based on characteristics of LED devices and the first voltages $V_{LED}$ for operation may be calculated in advance and stored in the memory.

The lookup table refers to a set of pre-calculated results of a given operation, and the set may be used as a reference to obtain values faster than a time required to calculate a result of the given operation.

In one or more embodiments, as the display apparatus 1 stores the lookup table of the forward voltages Vf and the first voltages $V_{LED}$ for operation depending on the display size, the processor 121 may compensate the first voltage $V_{LED}$ into the second voltage $V_{LED}$' based on the lookup table.

Specifically, as in FIG. 8, in the lookup table, 44 V of the forward voltage Vf and 48 V of operation voltage $V_{LED}$ may be stored for a display size of 50 inches, 46 V of the forward voltage Vf and 48 V of operation voltage $V_{LED}$ may be stored for a display size of 55 inches, and 48 V of the forward voltage Vf and 52 V of operation voltage $V_{LED}$ may be stored for a display size of 60 inches.

The voltage values stored in the lookup table are merely an example, and may be pre-calculated based on the whole size of the display apparatus 1 and the LED devices.

The stored forward voltage Vf may correspond to the largest of the pre-calculated forward voltages Vf of the LED blocks.

Referring to FIG. 9, the processor 121 may detect the forward voltage Vfn of each LED block by applying the first voltage $V_{LED}$ and detect a maximum value of the forward voltages Vfn of the respective LED blocks.

The processor 121 may determine a difference between the maximum value Vf_max of the forward voltages Vfn of the respective LED blocks and the first voltage $V_{LED}$ as the margin voltage $V_{LED}$-Vf_max.

For example, the processor 121 may apply the first voltage $V_{LED}$, which is a voltage for operation, to the LED module when the display size is 50 inches, and detect 47.5 V as the maximum value Vf_max of the forward voltages of the LED blocks.

When the voltage applied to the LED block is 47.5 V and the first voltage $V_{LED}$, which is a voltage for operation, is 48 V, the processor 121 may determine the margin voltage $V_{LED}$-Vf_max to be 0.5 V.

In another example, the processor 121 may apply the first voltage $V_{LED}$, which is a voltage for operation, to the LED module when the display size is 55 inches, and detect 48.5 V as the maximum value Vf_max of the forward voltages of the LED blocks.

When the voltage applied to the LED block is 50 V and the first voltage $V_{LED}$, which is a voltage for operation, is 48.5 V, the processor 121 may determine the margin voltage $V_{LED}$-Vf_max to be 1.5 V.

The memory may store a reference value pre-calculated by a system designer. For example, the processor 121 may determine the second voltage $V_{LED}$' by adding the margin voltage to the first voltage $V_{LED}$ when the margin voltage calculated in FIG. 9 is below the reference value stored in the memory.

Accordingly, the processor 121 may apply the second voltage $V_{LED}$' compensated to have no lack of margin voltage based on the lookup table to the LED module.

Referring to FIGS. 9 and 10 at the same time, a reference value based on which the processor 121 compensates the first voltage $V_{LED}$ to the second voltage $V_{LED}$' may be assumed to be 2.5 V.

For example, when the display size is 50 inches, the processor 121 may determine that the margin voltage $V_{LED}$-Vf_max is 0.5 V, which is below the reference value.

Accordingly, the processor 121 may determine the second voltage $V_{LED}$' to be 49.5 V by adding the margin voltage $V_{LED}$-Vf_max to the first voltage $V_{LED}$.

The processor 121 may then apply the second voltage $V_{LED}$' to the LED module to operate the LED module, and as the margin voltage $V_{LED}$-Vf_max increases by 0.5 V more than that of the first voltage $V_{LED}$, a voltage to be applied to the pixel IC 240 may increase.

In another example, when the display size is 55 inches, the processor 121 may determine that the margin voltage $V_{LED}$-Vf_max is 1.5 V, which is below the reference value.

Accordingly, the processor 121 may determine the second voltage $V_{LED}'$ to be 51.5 V by adding the margin voltage $V_{LED}$-Vf_max to the first voltage $V_{LED}$.

The processor 121 may then apply the second voltage $V_{LED}'$ to the LED module to operate the LED module, and as the margin voltage $V_{LED}$-Vf_max increases by 1.5 V more than that of the first voltage $V_{LED}$, a voltage to be applied to the pixel IC 240 may increase.

As a result, the processor 121 may stably operate the pixel IC 240, and thus gain an effect of reducing the flicker phenomenon caused by instable voltage application.

Figure 11:
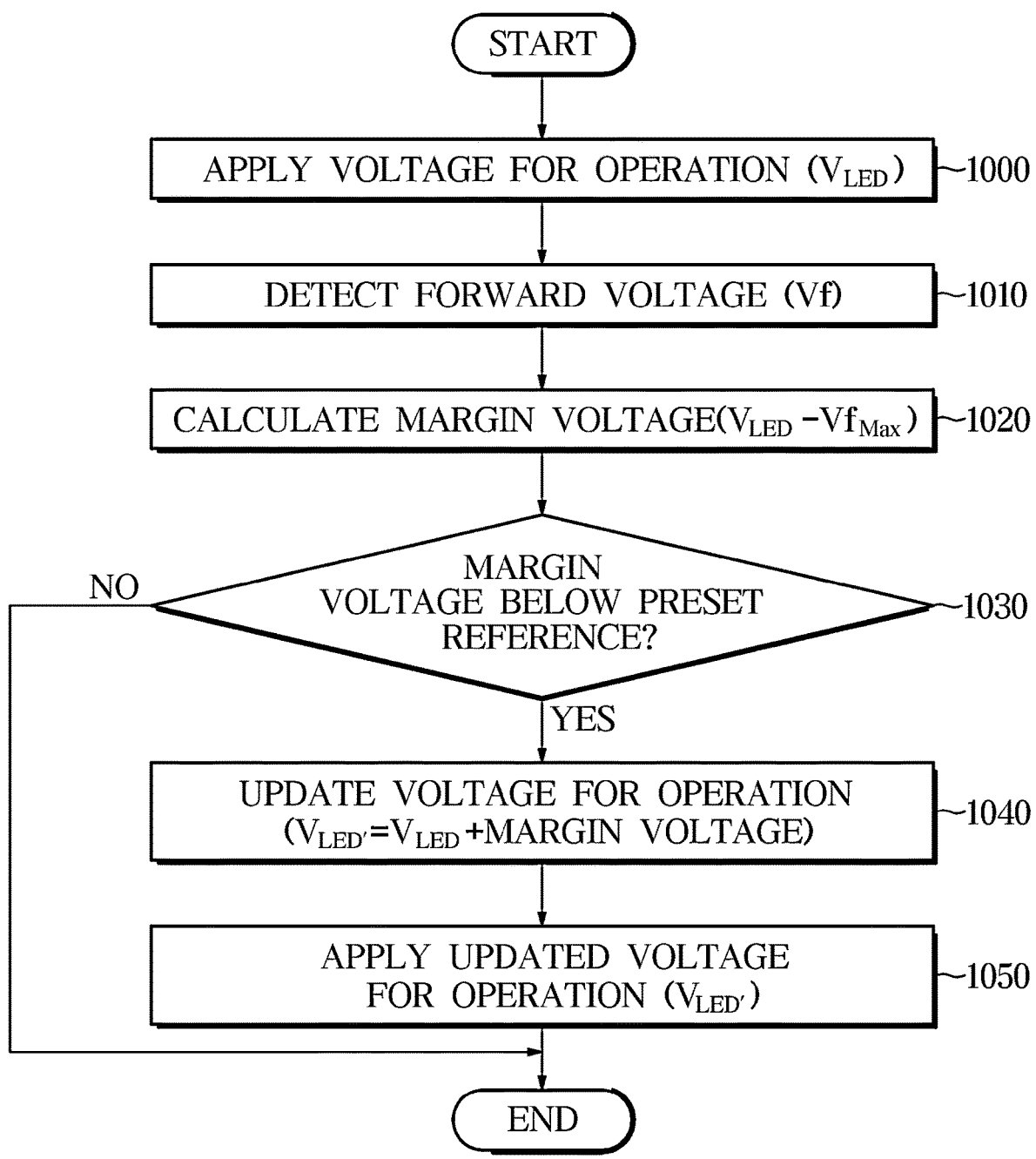
FIG. 11 is a flowchart of controlling a display apparatus, according to one or more embodiments of the disclosure.

FIG. 11 is a flowchart of controlling the display apparatus 1, according to one or more embodiments of the disclosure.

Referring to FIG. 11, the processor 121 may apply the voltage $V_{LED}$ for operation to the LED module, in 1000.

The processor 121 may then detect the forward voltage Vf for each LED block, and detect the maximum value Vf_max of the forward voltages, in 1010.

The processor 121 may determine a difference between the maximum value Vf_max of the forward voltages Vfn of the respective LED blocks and the first voltage $V_{LED}$ as the margin voltage $V_{LED}$-Vf_max, in 1020.

The processor 121 may compare the reference value stored in the memory with the margin voltage $V_{LED}$-Vf_max, and specifically, determine whether the margin voltage $V_{LED}$-Vf_max is below the preset reference value, in 1030.

The processor 121 may determine that the voltage $V_{LED}$ is not sufficient to operate the pixel IC 240 based on the fact that the margin voltage $V_{LED}$-Vf_max is below the preset reference value, in 1030.

When the margin voltage $V_{LED}$-Vf_max is below the preset reference value, the processor 121 may update the first voltage $V_{LED}$, which is a voltage for operation, to the second voltage $V_{LED}'$, in 1040.

Specifically, the processor 121 may determine the second voltage $V_{LED}'$ by adding the margin voltage $V_{LED}$-Vf_max to the first voltage $V_{LED}$, and apply the second voltage $V_{LED}'$ to the LED module in 1050.

As described above, it is possible for the processor 121 to compensate the voltage for operation by the margin voltage $V_{LED}$-Vf_max even when the margin voltage $V_{LED}$-Vf_max becomes insufficient based on the distribution of the forward voltages Vf of LED devices, thereby stably operating the pixel IC 240.

Consequently, the display apparatus 1 may have an effect of reducing the flicker phenomenon by stably operating the pixel IC 240 even when the LED module is operated in the AM method.

Specific embodiments of the method of controlling the display apparatus 1 overlap the embodiments of the display apparatus 1, so the description thereof will not be repeated.

The embodiments of the disclosure have thus far been described with reference to accompanying drawings. It will be obvious to those of ordinary skill in the art that the disclosure may be practiced in other forms than the embodiments of the disclosure as described above without changing the technical idea or essential features of the disclosure.

The above embodiments of the disclosure are only by way of example, and should not be construed in a limited sense.

What is claimed is:

1. A display apparatus comprising:
   at least one light emitting diode (LED) block comprising LEDs connected in series;
   a driver integrated circuit (IC) configured to apply a voltage to the at least one LED block;
   at least one processor; and
   memory storing at least one instruction that, when executed by the at least one processor, cause the display apparatus to:
   detect a maximum value of at least one forward voltage of the at least one LED block, respectively, based on a first voltage being applied to the at least one LED block;
   determine a margin voltage based on a difference between the first voltage and the maximum value of the at least one forward voltage;
   determine a second voltage to be applied to the at least one LED block by adding the first voltage to the margin voltage,
   wherein the second voltage is determined based on the margin voltage being below a preset reference value.

2. The display apparatus of claim 1, wherein the at least one instruction further causes the display apparatus to:
   control the driver IC to drive the at least one LED block based on the second voltage.

3. The display apparatus of claim 1, wherein the first voltage has a value stored in a lookup table of the memory.

4. The display apparatus of claim 3, wherein the at least one instruction further causes the display apparatus to:
   update the lookup table by changing the first voltage to the second voltage.

5. The display apparatus of claim 4, wherein the at least one instruction further causes the display apparatus to:
   control the driver IC to drive the at least one LED block based on the updated lookup table.

6. The display apparatus of claim 1, further comprising:
   a voltage sensor,
   wherein the at least one instruction further causes the display apparatus to determine the second voltage to be applied to the at least one LED block by detecting the at least one forward voltage of the at least one LED block from the voltage sensor.

7. The display apparatus of claim 1, wherein the at least one instruction further causes the display apparatus to determine the second voltage to be applied to the at least one LED block by detecting the at least one forward voltage.

8. A method of controlling a display apparatus, the method comprising:
   applying a first voltage to at least one light emitting diode (LED) block comprising LEDs connected in series;
   detecting a maximum value of at least one forward voltage of the at least one LED block, respectively, based on the first voltage being applied to the at least one LED block;
   determining a margin voltage based on a difference between the first voltage and the maximum value of the at least one forward voltage;
   determining a second voltage to be applied to the at least one LED block by adding the first voltage to the margin voltage,
   wherein the determining of the second voltage comprises determining the second voltage based on the margin voltage being below a preset reference value.

9. The method of claim 8, further comprising:
   controlling a driver integrated circuit (IC) to drive the at least one LED block based on the second voltage.

* * * * *